United States Patent [19]
Carlson

[11] 3,947,666
[45] Mar. 30, 1976

[54] CARD READER

[75] Inventor: Robert D. Carlson, Danville, Calif.

[73] Assignee: Drake Manufacturing Company, Harwood, Ill.

[22] Filed: Aug. 9, 1974

[21] Appl. No.: 496,356

[52] U.S. Cl. ..... 235/61.11 E; 235/61.12 R; 250/569
[51] Int. Cl.[2] ............... G06K 7/10; G06K 19/04
[58] Field of Search 235/61.11 E, 61.11 D, 61.11 R, 235/61.12 R, 61.12 N, 61.12 M, 61.7 B, 61.7 R, 61.11 H; 250/569, 568; 179/90 CL; 360/88

[56] References Cited
UNITED STATES PATENTS

| 3,328,589 | 6/1967 | Ferguson | 250/569 |
| 3,636,317 | 1/1972 | Torrey | 235/61.12 N |
| 3,637,988 | 1/1972 | Yanagawa | 235/61.6 J |
| 3,852,572 | 12/1974 | Nicoud | 235/61.11 E |
| 3,858,032 | 12/1974 | Scantlin | 235/61.12 R |

Primary Examiner—Daryl W. Cook
Assistant Examiner—Robert M. Kilgore
Attorney, Agent, or Firm—Flehr, Hohbach, Test, Albritton & Herbert

[57] ABSTRACT

A card reader for reading a Hollerith coded card where the holes in the card are scanned by a single array of photo detectors as the card is withdrawn from a slot, and where an edge detector determines when the card is fully inserted into the slot so as to activate a scanner and signal a memory unit to accept data from the scanner, and where an error detector detects any improper scanning of the card by counting the number of rows scanned and prevents processing of incorrectly generated data.

5 Claims, 6 Drawing Figures

CARD READER

BACKGROUND OF THE INVENTION

The present invention is directed to apparatus for sensing data bits which are carried on a card.

Data and information have been stored on punched cards in the form of holes arranged in columns and rows, generally with a single punched hole in any one row.

Readers have been provided which employ a mechanical probe to detect the presence of holes on a card. The mechanical probes enter through the hole to complete an electrical circuit physically. Such a procedure is slow and can damage the card.

Photoelectric sensors have been employed in place of the mechanical probes, but the card has still been subjected to a friction-based transport past the sensors which can damage the card. Card readers have also provided a method for reading a card without moving the card, but this required a large matrix of photsensitive devices. Card readers in the past required a certain dexterity in inserting and removing the card to avoid an error in the reading of the card. Furthermore, prior art readers did not allow a card owner to retain possession of a card during the reading procedure.

Thus, there is a need for a card reader which can quickly read a card with no chance of damage to the card; which will allow an untrained card owner, with a minimal degree of dexterity, to submit a card to a reading procedure during which the card owner can retain possession of the card; which can detect any possible error by the card owner-operator; and which requires but a simple array of sensor elements.

OBJECTS AND SUMMARY OF THE INVENTION

It is, therefore, a general object of the invention to provide an improved card reader which can quickly scan a card which is inserted by a customer, and aklow the customer physically to retain control of the card at all times.

It is another object of the invention to demand only a minimal degree of operator dexterity or training, and to detect any error in the action of the operator.

In accordance with the above objects, there is provided apparatus for receiving a card which is inserted by a customer, and which scans the card as it is withdrawn from the apparatus by the customer's own hand. Data bits on the card are stored by punched holes such that the degree if phototransmission through the card will determine the presence or absence of a data bit. A single array of photo transmitters and photosensitive devices scans the card as it is withdrawn from the apparatus.

DETAILED DESCRIPTION OF THE PREFERRED EMBODIMENT

Figure 1:
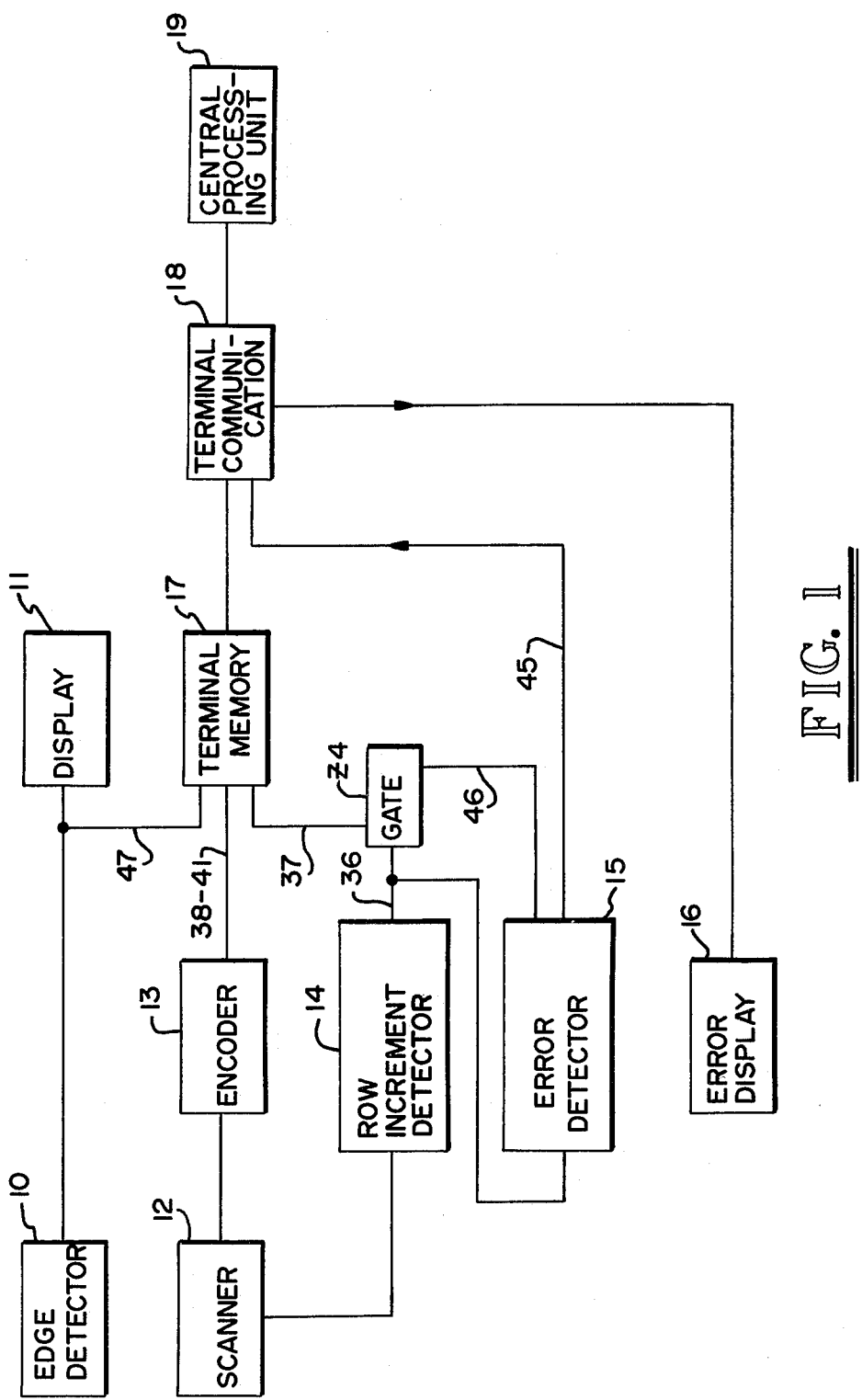
FIG. 1 is a block diagram showing the basic operation of a card reader embodying the present invention.
Figure 4:
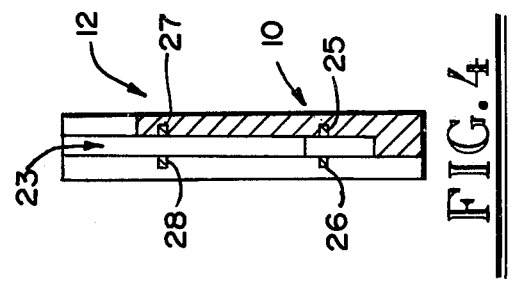
FIG. 4 is a side cross-sectional view taken along line 4—4 of FIG. 3.
Figure 2:
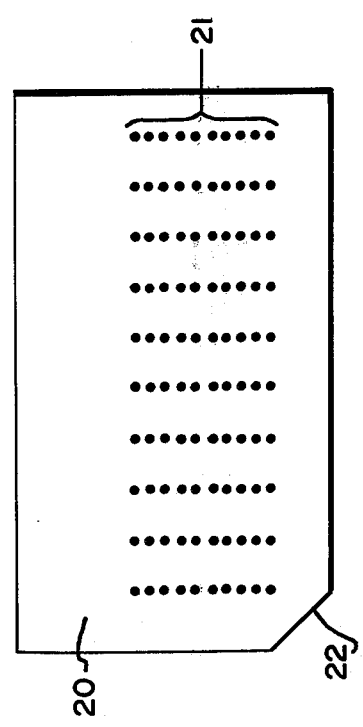
FIG. 2 is an elevational view of a typical data card which is to be scanned.
Figure 3:
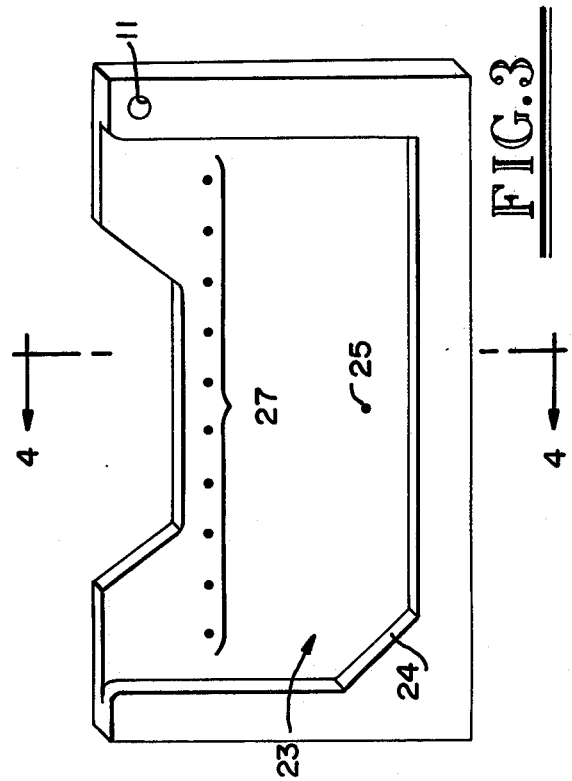
FIG. 3 is a front view of the reader into which a card is inserted, with the top plate removed.

FIG. 1 shows the basic operation of the card reader of the present invention and FIGS. 2 - 4 the physical configuration of the reader. A card 20 (FIG. 2) is inserted into the slot 23 provided as shown in FIGS. 2 and 3. The edge detector 10 will detect full insertion of the card into the slot, and then activate the LED display 11. The display 11 alerts the user that the card is ready to be scanned. The edge detector 10 also outputs data signals on line 47 to the terminal memory 17. This signifies that the data card is properly positioned and that data received by the terminal memory 17 may be stored therein. The card 20 is then withdrawn from the slot, ideally in a single smooth motion.

A scanner 12 (FIG. 4) scans the card 20 as it is withdrawn from the slot 23, and develops data signals for each row of the card which corresponds to a data bit located within the row. These signals are passed in parallel to an encoder 13, which encodes the decimal output of the scanner 12 into a four digit binary. The binary output of the encoder 13 is fed to the card reader terminal memory 17 as each row is scanned, by means of the row increment detector 14. This device detects the passing of each row past the scanner 12. The row increment detector 14 triggers a strobe signal (KEYBOARD STROBE on line 37) which allows the binary output from the encoder 13 to be accepted by the terminal memory 17. A remote CPU 19 later stores and processes the data from terminal memory 17.

The error detector 15 counts the number of rows which have been scanned by monitoring the row increment detector 14 via line 36. When the predetermined number of rows has been counted, the error detector 15 signals gate Z4 via line 46 to prevent generation of the KEYBOARD STROBE signal on line 37, so that no further binary outputs of the encoder are accepted. If too many rows pass the scanner 12, such as by improper extraction of the card, which may occur by a nervous hand withdrawing the card, the error detector 15 signals the terminal communication system 18 via line 45. The terminal communication 18 controls transmission of data from the terminal memory 17 to the central processing unit 19. The error signal on line 45 thus causes the terminal communication to prevent transmission of erroneous data to the CPU 19. The error detector 15 also determines when the card has been withdrawn from the scanner 12. If this withdrawal occurs before the correct number of rows has been scanned, the error detector 15 outputs a signal on line 45 as described above to prevent processing of the data stored in the terminal memory 17. The error signal which is sent by the error detector 15 on line 45 also causes the terminal communication 18 to activate a display 16. This error display 16 alerts the user than an error in the reading process has prevented proper processing of the card's data.

Referring to FIGS. 2, 3 and 4 in detail, the data card 20 which is used in the preferred embodiment has the standard dimensions of 2.125 inches by 3.375 inches (5.40 cm × 8.57 cm), and is constructed of opaque material, except for certain punched holes. These holes are located in a matrix of hole-sites 21 corresponding to several rows and columns; specifically, ten columns and either eight or ten rows. The holes correspond to binary 1 data bits, and one such hole is located in each and every row to represent a decimal number. One of the card's corners 22 is beveled to provide asymmetry for proper positional referencing of the card.

The card is inserted into a reader slot 23 as shown in FIGS. 3 and 4. The dimensions of the slot correspond to those of the card. The end opposite the receiving aperture of the slot is keyed by corner 24 to allow the card to be inserted fully into the slot in only one orientation; i.e., that one corresponding to the beveled edge on the card. Once the card has been inserted to the full extent of the slot, it is properly positioned to be scanned.

Referring now to FIG. 4, a photo emitter 25 and a photo transistor 26 are juxtaposed on opposite sides of the slot such that the light emission from the photo emitter is incident on the photo transistor. This photo pair is positioned near the bottom of the slot so that the opaque card can only block transmission between the two elements when it has been fully inserted into the slot. Thus, this photo pair serves as the photoresponsive element of the edge detector 10 which detects the leading edge of the inserted card. When there is no transmission of the emitted light to the photo transistor, the card is known to be fully inserted, and is properly positioned to be scanned.

The scanner 12 is composed of linear arrays of photo emitters 27 and photo transistors 28 which are juxtaposed on opposite sides of the slot 23 such that the light emission from the photo emitters is incident on the respective photo transistors. Thus, each pair serves as a means for determining the presence of an opaque or transparent medium between the two of them. When the card is properly positioned to be scanned all punched holes on the card which correspond to data bits have been inserted past the scanner with only the opaque portion of the card lying between the arrays of the scanner 12. The card 20 should then be withdrawn from the slot 23 with a single smooth action. The actual speed range of withdrawal which is acceptable is broad and not critical. The direction of motion, however, must be maintained and not reversed once the withdrawal has started; such reversal will produce an error signal as explained below.

Figure 5A:
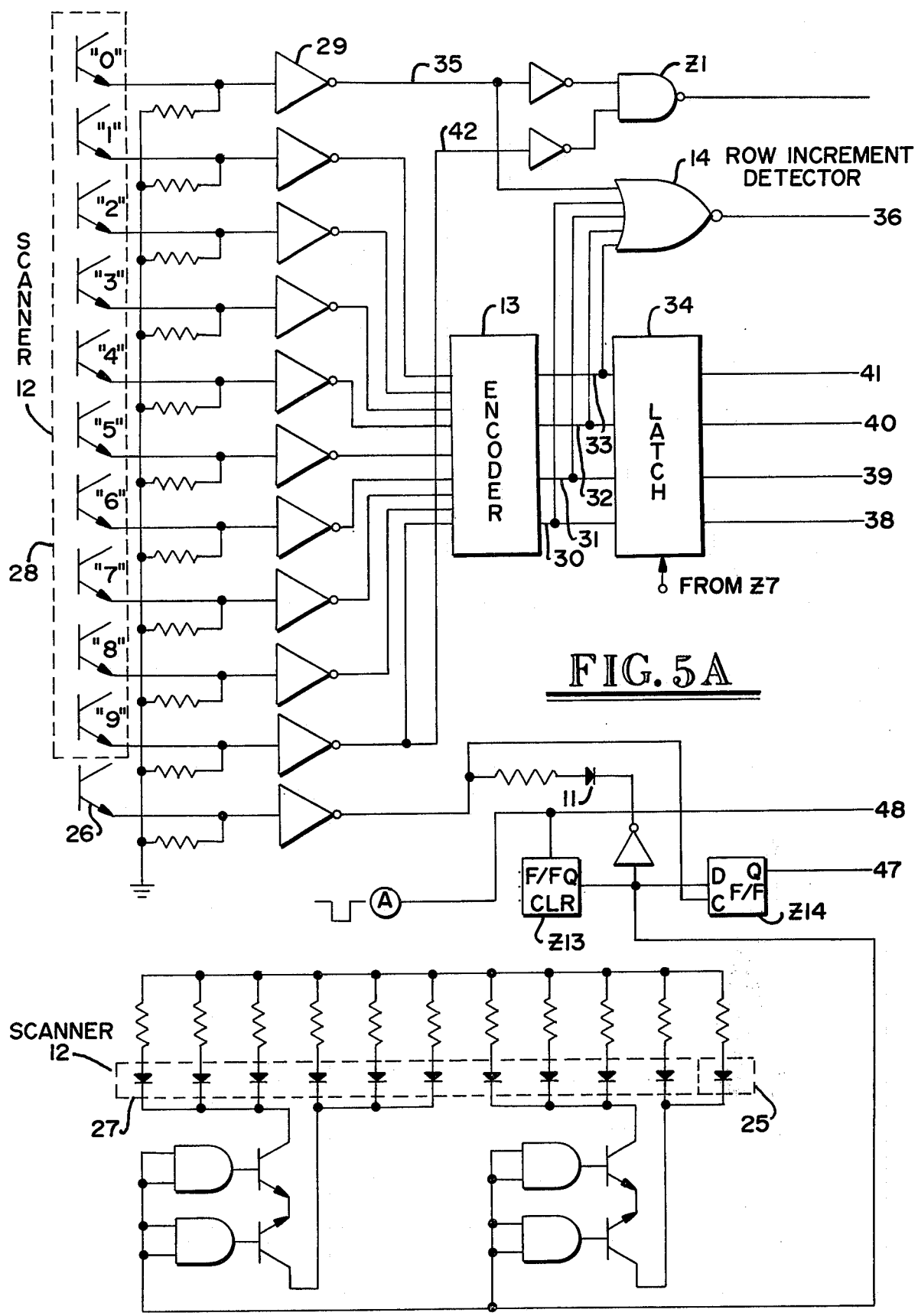
FIGS. 5A and 5B are a schematic drawing of electrical circuits contained within the apparatus of FIG. 1.
Figure 5B:
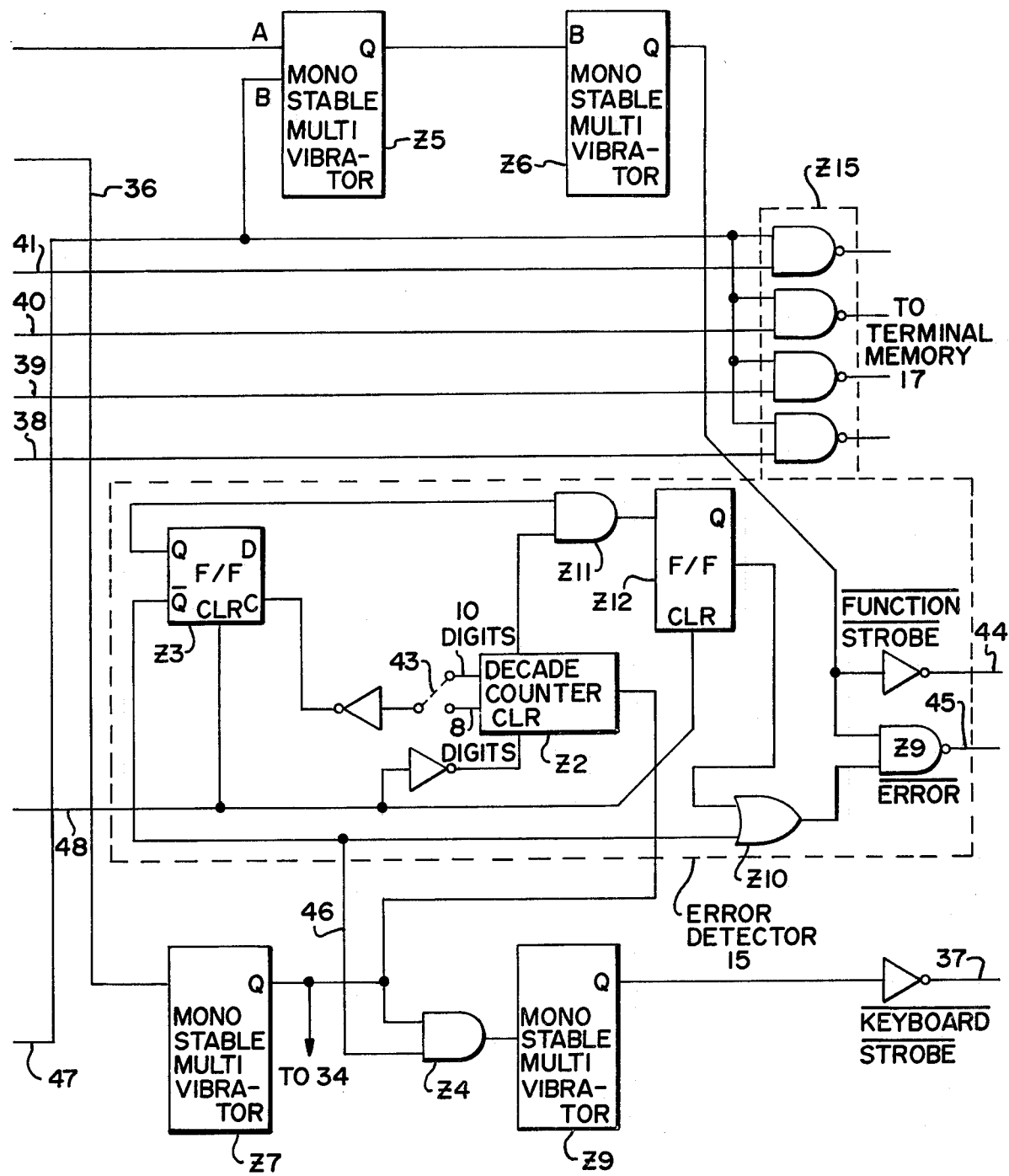

Referring now to FIGS. 5A and 5B, when the system is energized, a signal is input at A to flip-flop Z13 which activates the photo emitters and resets the counters within the error detector 15 via line 48. As the card is withdrawn, one data hole in each row will pass by its respective scanner photo pair. When the hole is in alignment with the photo pair, the emitted light received by the photo transistor 28 will cause an output on the common-collector connected photo transistor. This output is fed to a Schmitt-trigger 29 which produces a square wave representing the presence of a data hole at one of the photo pair locations on the scanner. The square wave pulses which are output from the Schmitt triggers are weighted from 0 to 9, depending upon from which photo pair in the reader they originated, to thus represent a decimal number. The square wave pulses are fed into an encoder 13 which encodes the decimal input to a four bit binary output on lines 30, 31, 32 and 33.

The binary output from the encoder is stored in the latch 34. The binary output on lines 30, 31, 32 and 33 and the output on line 35 from the photo transistor corresponding to the decimal 0 (which is not encoded) are monitored by the NOR gate 14, which serves as a row increment detector. Thus, each time that a data hole aligns with a photo pair in the scanner 12 a square wave pulse will appear on one of the five inputs to the NOR gate 14. This gate provides an output on line 36 which causes a $\overline{\text{KEYBOARD STROBE}}$ signal on line 37 by means of monostable multivibrators Z7, Z8 and gate Z4. The triggering of the Q output of Z7 and of the $\overline{\text{KEYBOARD STROBE}}$ output causes the stored data in the latch 34 to be read into the terminal memory 17 by means of lines 38, 39, 40 and 41 during the next cycle of the MOS memory 17, which lasts 500 microseconds. The same process occurs for each row, with the binary code which corresponds to each data bit being input to the terminal memory 17. The last row on the card to be scanned contains a check digit, which is used to ascertain that a correct scan has bee made on the card. Thus, dual checking is provided, in that the number of rows is counted also, as will be explainted below.

AND gates Z15 connect lines 38–41 of latch 34 to memory 17 and ensure that no erroneous data is transmitted until a true output on edge detector line 47 is present.

The card is determined to be out of the scanner area by means of AND gate Z1. Since when the card 20 is between the linear arrays 27, 28 of the scanner 12 only one data hole will be aligned with a photo pair at any one time, the transmission of emitted light to more than one photo transistor will imply that the card is not between the scanner 12. The photo pairs corresponding to digits 0 and 9 are used to determine thusly the end of the card withdrawal by means of lines 35 and 42.

The output from NOR gate 14 on line 36 is also used to trigger a decade counter Z2. Each incrementation of rows by NOR gate 14 is counted until the proper number of rows has been counted. This number must be predetermined, and is established by means of a jumper output 43 from the decade counter Z2 to be either 8 or 10; 10 is used in the present embodiment. When the correct number of rows has been counted, the Q output of flip-flop Z3 is set. The resulting termination of the $\overline{Q}$ output prevents the production of any further $\overline{\text{KEYBOARD STROBE}}$ signals, by means of AND gate Z4.

When the edge detector 10 senses the leading edge of the card a signal is input to the C input of flip-flop Z14, which sets the Q output thereof, on line 47. This signal on line 47 is input to monostable multivibrator Z5 and to NAND gates Z15, and provides a dual checking function. The binary data on lines 38–41 will not be fed to the terminal memory 17 without the presence of the signal on line 47 at gates Z15; and the Q output of Z5 will not be set without the coincidence of the signal on line 47 and the signal from Z1. The Q output of Z5 triggers Z6 which produces the $\overline{\text{FUNCTION STROBE}}$ output on line 44. The $\overline{\text{FUNCTION STROBE}}$ signal signifies the end of the card scanning cycle. Thus, an end of card signal is gnerated by Z5 only after a card has been properly inserted into and then withdrawn from the slot. The end of card output from Z6 also is input to NAND gate Z9. When the other input of Z9 goes true an $\overline{\text{ERROR}}$ signal is output on line 45. This indicates that an incorrect number of rows on the card has been scanned. For example, for a ten row card, the $\overline{Q}$ output of flip-flop Z3 will be true until the tenth row has been counted. This $\overline{Q}$ output is input to OR gate Z10 thus producing a true output to Z9. Thus, when the $\overline{Q}$ output of Z3 is true (meaning that fewer than 10 rows have been counted), and when Z6 goes true (meaning that the card has been fully withdrawn past the scanner), a coincidence condition occurs at AND gate Z9 and an $\overline{\text{ERROR}}$ signal is produced as mentioned above.

An error signal is also produced if more than ten rows are counted. Once the tenth row has been counted, the Q output of Z3 goes true causing an input of Z11 to be true. If another row is counted after this, the decade counter output at Z2 goes true, causing the input at Z11 to be true. Therefore, AND gate Z11 produces an output which sets Z12. The Q output of Z12 thus goes true causing OR gate Z10 to produce a true output and a true input at Z9. Thus if the q output of Z12 goes true (meaning that more than 10 rows have been scanned), when Z6 is true (meaning that the card has been fully withdrawn past the scanner), a coincidence condition occurs at AND gate Z9 and an $\overline{\text{ERROR}}$ signal is produced as mentioned above.

This $\overline{\text{ERROR}}$ signal prevents the central processing unit 19 from receiving the data stored in the terminal memory 17 and also is used to alert the operator by means of the error display 16 that the card must be scanned again. This embodiment has been used with 100 percent effectiveness in scanning cards or in detecting an error in the scanning process.

I claim:

1. Apparatus for reading a card which has a plurality of data bits located in a predetermined plurality of rows and a predetermined plurality of columns, wherein there is at least one bit in each row and which comprises: receiving means having a slot of a predetermined depth into which said card may be inserted; means for detecting insertion of said card to said predetermined depth; means for scanning row by row said data bits on said card including a linear array of photo emitters, as said card is withdrawn from said slot, and providing a data output signal for each of said data bits which is scanned; means responsive to said data output signals for determining if said predetermined plurality of rows has been scanned including means for sensing when a row has been scanned; means responsive to said sensing means for counting the number of rows which have been scanned and for indicating when the number of rows which have been counted equals the number of said predetermined plurality of rows, and means for producing an error signal output when the number of said rows scanned by said scanning means is fewer than said number of predetermined rows including, means for receiving a first output from said counting means when the number of rows which have been scanned is less than the number of said predetermined plurality of rows, means for producing a second output when all of said data bits on said card have been withdrawn past said scanning means, and gating means responsive to said first and second couputs for producing said error signal output.

2. Apparatus as in claim 1 including memory means for storing said data bits and gating means responsive to said means for detecting full insertion of said card into said slot, to store said data bits.

3. Apparatus as in claim 1 wherein said error signal output prevents a peripheral data processing unit from receiving said scanned data.

4. Apparatus for reading a card which has a plurality of data bits located in a predetermined plurality of rows and a predetermined plurality of columns, wherein there is at least one bit in each row and which comprises: receiving means having a slot of a predetermined depth into which said card may be inserted; means for detecting insertion of said card to said predetermined depth; means for scanning row by row said data bits on said card including a linear array of photo emitters, as said card is withdrawn from said slot, and providing a data output signal for each of said data bits which is scanned; means responsive to said data output signals for determining if said predetermineed plurality of rows has been scanned including means for sensing when a row has been scanned; means responsive to said sensing means for counting the number of rows which have been scanned and for indicating when the number of rows which have been counted equals the number of said predetermined plurality of rows; and means for producing an error signal output when the number of said rows scanned by said scanning means is more than said number of predetermined rows including, means for receiving one output signal from said counting means when the number of said rows which have been scanned exceeds the number of said predetermined plurality of rows, means for producing another output when all of said data bits on said card have been withdrawn past said scanning means, and gating means responsive to said one and another outputs for producing said error signal output when said one and another signals are coincident.

5. Apparatus as in claim 4 wherein said error signal output prevents a peripheral data processing unit from receiving said scanned data.

* * * * *